(12) United States Patent
Bartholdy

(10) Patent No.: US 6,667,271 B2
(45) Date of Patent: Dec. 23, 2003

(54) HYDROTREATING CATALYST PARTICLES

(75) Inventor: Jesper Bartholdy, Bronshoj (DK)

(73) Assignee: Haldor Topsoe A/S, Lyngby (DK)

( * ) Notice: Subject to any disclaimer, the term of this patent is extended or adjusted under 35 U.S.C. 154(b) by 23 days.

(21) Appl. No.: 09/935,986

(22) Filed: Aug. 23, 2001

(65) Prior Publication Data
US 2002/0045540 A1 Apr. 18, 2002

(30) Foreign Application Priority Data
Aug. 30, 2000 (DK) .......................... 2000 01280

(51) Int. Cl.⁷ .............. B01J 27/047; B01J 27/049; B01J 23/00
(52) U.S. Cl. .............. 502/219; 502/221; 502/313
(58) Field of Search .............. 502/219, 221, 502/313

(56) References Cited

U.S. PATENT DOCUMENTS

| | | | | |
|---|---|---|---|---|
| 3,901,821 A | * | 8/1975 | Retallick | 252/410 |
| 4,131,643 A | * | 12/1978 | Utsunomiya et al. | 423/239 |
| 4,337,178 A | * | 6/1982 | Atwood et al. | 252/466 J |
| 4,441,990 A | | 4/1984 | Huang | 208/111 |
| RE32,044 E | * | 12/1985 | Atwood et al. | 502/335 |
| 5,082,819 A | | 1/1992 | Boeck et al. | 502/212 |
| 5,326,915 A | | 7/1994 | Viola et al. | 568/474 |
| 5,989,412 A | * | 11/1999 | Okagami et al. | 208/251 H |

* cited by examiner

Primary Examiner—Steven Bos
Assistant Examiner—William G. Wright
(74) Attorney, Agent, or Firm—Dickstein Shapiro Morin & Oshinsky, LLP

(57) ABSTRACT

Hydrotreating catalyst containing one or more metal oxides and/or sulphides selected from Group VI-B and Group VIII of the Periodic Table supported on a porous refractory carrier, wherein the catalyst being in form of an angular extrudate with rounded edges.

1 Claim, 1 Drawing Sheet

HYDROTREATING CATALYST PARTICLES

Figure 1:
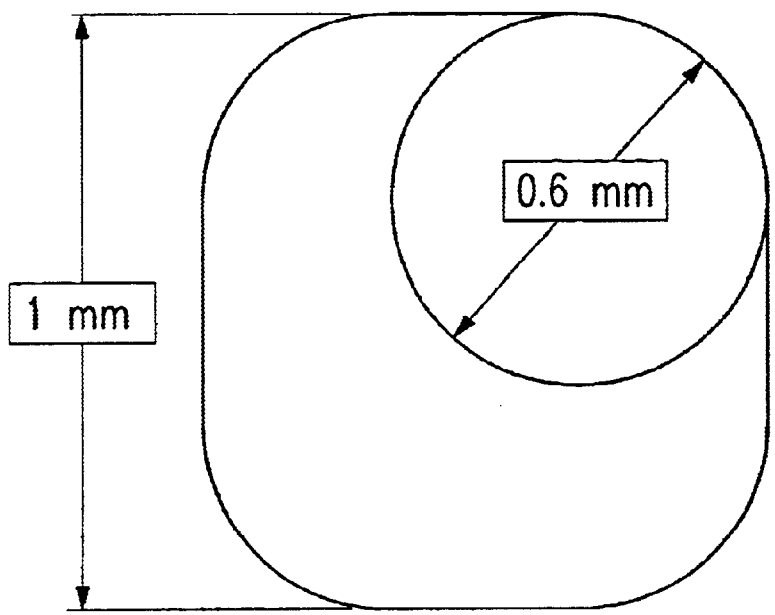

Hydroprocessing reactions are slow, and it is therefore important to have catalyst with a large internal surface area. In order to maximise the area available the porosity of the catalysts should be as large as possible. For catalysts that are used to hydrotreat heavy oils, the porosity becomes even more important, as the pore space is used for accumulating metals and coke from the feed. For these catalysts, the maximum porosity that can be obtained determines not only the activity of the catalyst but also the life as the storage capacity for coke and metals are related to the porosity. The strength of the catalyst shape (SCS) decreases as the porosity is increased. For many applications SCS of the catalyst particles is a limiting factor of the catalyst porosity.

Heteroatoms can be removed from mineral oils by hydrotreating the oil over a hydroprocessing catalyst at elevated temperature often in the range of 250–450° C., with hydrogen at a partial pressure of 15–200 bar and with a LHSV in the range of 0.1–5.0 $h^{-1}$. The exact conditions will depend on the required degree of conversion, on the type of feedstock that are to be treated and on the desired run length. For a refiner, the run length is a very important consideration. A shorter run length means high costs due to a higher rate of catalyst replacement, and relatively more downtime (i.e. time off-stream) for catalyst change-out with a resultant loss of revenue due to reduced production. The catalyst used in the hydrotreating reactor may be any catalyst used for hydrotreating of a hydrocarbon feed being known in the art. The catalyst contains at least one metal on a porous refractory inorganic oxide support. Examples of metals having hydrotreating activity include metals from groups VI-B and VIII e.g. Co, Mo, Ni, W, Fe with mixtures of Co—Mo, Ni—Mo and Ni—W preferred. The metals are employed as oxides or sulphides. Examples of porous material suitable as support include alumina, silica-alumina, alumina-titania, natural and synthetic molecular sieves and mixtures hereof, with the alumina and silica-alumina being preferred. The catalyst is thereby usually in shape of cylindrical, trilobal, quardrolobal or spherical geometries. Size and shape of the catalysts particles depends on the actual application. In many processes, applications of catalysts are limited by diffusion, in these cases the particle size has to be as small as possible. In upgrading of heavy oils containing trace amounts of metals it is in particular important to use catalysts in form of small particles as diffusion of the metal bearing species are under strong diffusion control. In course of the process the metals are accumulated in the pore system of the catalyst and the effective life of the catalyst is determined by its ability to continue to remove metals. The capacity for metal removal depends on distribution of the metals in the pore system and on the space available in the catalyst for storing coke and metals. The highest metal storage capacity is obtained when the metal deposited from the feed is distributed evenly over the cross section of the catalyst pellets. An even distribution can be obtained by using catalysts with large pores, a bimodal pore system with large macropores or by using catalysts in the form of small extrudates. A high volume for storing coke and metals can be made by increasing the porosity of the carriers for the catalysts, using conventional manufacturing techniques for catalyst carriers.

The steps that are taken to increase the porosity of catalysts reduce the strength of the individual particles. The smaller the particles the less the strength, high temperature treatment for increasing the pore volume of the catalyst reduces strength of the particles and the higher the porosity the lower the strength. Impact of porosity on strength is well known and described by a relationship developed by Rytzkevitz (J. Amer. Ceram. Soc., 36 (2), pp 65–68 (1953)):

$$SCS = exp(-b \times \Theta);$$

wherein $\Theta$ is the porosity of the catalyst in cc pore volume/cc particle volume, and b is constant for porous materials between 5 and 7.

In the above relationship constant b depends on both properties and geometry of the porous catalyst body. For a given material the strength changes when changing the shape. Shapes that result in increased strength allow use of materials with larger porosity at a desired mechanical strength.

The general object of the invention is to provide catalysts with shapes having improved mechanical strength determined by the use of the ASTM D4179 Standard Test Method for Testing Pellet Strength of Formed Catalyst Shapes (SCS) and high porosity. Those catalysts are useful in heavy oil up-grading where the effective life of the catalysts are determined by ability of the catalyst to store contaminants such as metal and coke. In ebullating bed service the use of the geometry according to the invention improves mechanical strength of the catalyst without changing the ebullating characteristics of the catalysts as the geometry is close to the usual cylindrical extrudates that are used for these types of processes.

Accordingly, this invention provides a hydrotreating catalyst containing one or more metal oxides and/or sulphides selected from Group VI-B and Group VIII of the Periodic Table supported on a porous refractory carrier being in form of an angular extrudate with rounded edges.

EXAMPLE 1

1000 g of B20 alumina, commercially available from Haldor Topsøe A/S and y g of water was mixed in a sigma kneeler for 15 minutes until pasta suitable for extrusion was formed. The formed pasta was divided into three parts that was extruded in different shapes according to Examples 2–4 below.

EXAMPLE 2

(Reference)

The pasta made in Example 1 was extruded in the form of 1 mm cylindrical extrudates in a piston type extruder. The extrudates made was dried in air for 24 hours and calcined in an oven by heating the extrudates to 850° C. for 2 hours. The dimension of the resulting alumina carrier was determined using a caliber, the porosity was determined by measuring the intrusion of Hg using a Quantacrome Porosimeter, the SCS was determined using the ASTM D4179 Standard Test Method for Testing Pellet Strength of Formed Catalyst Shapes. The results are listed in Table 1.

EXAMPLE 3

The pasta from Example 1 was extruded in the form of 1 mm squared extrudates with rounded edges. The shape of the extrudates is evident from the drawing in FIG. 1. Extrusion, drying, calcining and measurement was made in the same manner as listed under Example 2.

EXAMPLE 4

The pasta from Example 1 was extruded in the form of 1.1 mm squared extrudates with rounded edges. The shape of the extrudates is evident from the drawing in FIG. 1. Extrusion, drying, calcining and measurement was made in the same manner as listed under Example 2.

TABLE 1

Side crushing strength of squares with rounded edges.

| | SCS KP/MM | Pore Volume, c.c./kg | Diameter mm |
|---|---|---|---|
| Example 2, reference | 0, 51 | 947 | 1, 01 |
| Example 3 | 1, 04 | 959 | 1, 01 |
| Example 4 | 1, 28 | 972 | 1, 11 |

As seen from Table 1 above the SCS is much higher than the side crushing strength of the comparative product. For products in a comparative size the SCS is more than 2 times the SCS of a conventional product.

EXAMPLE 5

A pasta was prepared in the same manner as the pasta in Comparative Example 1, except that the ingredients was only mixed in a sigma kneeler for 14 minutes until pasta suitable for extrusion was formed. A part of the pasta in the Zigma mixer was divided into three parts and was extruded in different shapes according to Examples 6–8.

EXAMPLE 6
(Reference)

The pasta from Example 5 was extruded in the form of 1 mm cylindrical extrudates with rounded edges. The shape of the extrudates is shown in FIG. 1. Extrusion, drying, calcining and measurement was made in the same manner as listed under Example 2.

EXAMPLE 7

Figure 2:
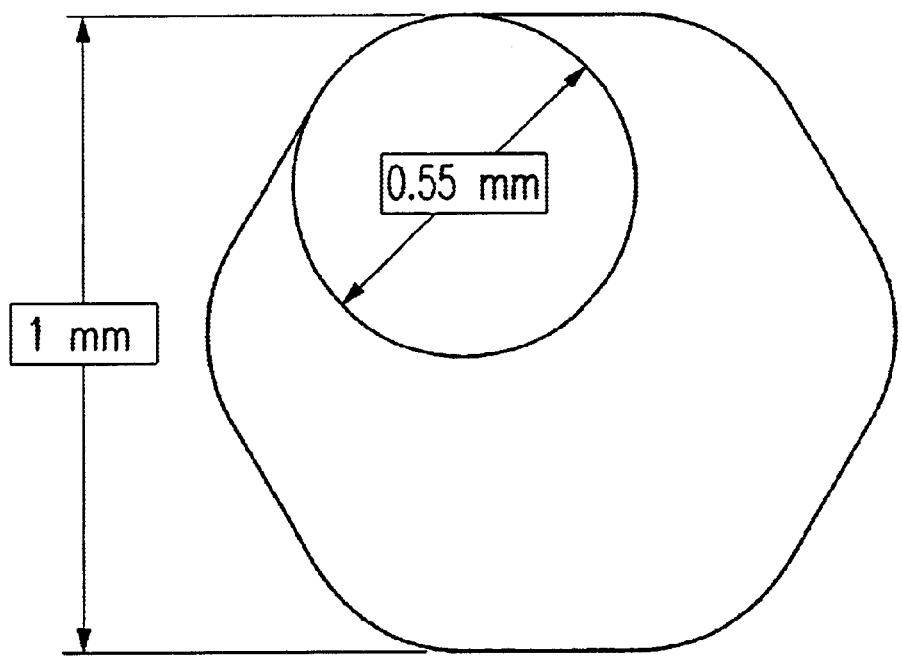

The pasta from Example 5 was extruded in the form of 1 mm squared extrudates with rounded edges. The shape of the extrudates is shown in FIG. 2. Extrusion, drying, calcining and measurement was made in the same manner as listed under Example 2.

EXAMPLE 8

The pasta from Example 5 was extruded in the form of 1 mm hexagonal extrudates with rounded edges. The shape of the extrudates is shown in FIG. 2. Extrusion, drying, calcining and measurement was made in the same manner as listed under Example 2.

EXAMPLE 9

The remaining pasta from Comparative Example 2 was mixed for an additional 2 minutes and was then formed. The pasta formed was divided into three parts that was extruded in different shapes according to Examples 10–12.

EXAMPLE 10
(Reference)

The pasta from Example 5 was extruded in the form of 1 mm cylindrical extrudates with rounded edges. The shape of the extrudates is shown in FIG. 1. Extrusion, drying, calcining and measurement was made in the same manner as listed under Example 2.

EXAMPLE 11

The pasta from Example 5 was extruded in the form of 1 mm squared extrudates with rounded edges. The shape of the extrudates is shown in FIG. 2. Extrusion, drying, calcining and measurement was made in the same manner as listed under Example 2.

EXAMPLE 12

The pasta from Example 5 was extruded in the form of 1 mm hexagonal extrudates with rounded edges. The shape of the extrudates is shown in FIG. 2. Extrusion, drying, calcining and measurement was made in the same manner as listed under Example 2.

After the preparation the porosity and the mechanical strength was determined of the particles made according to Examples 6–8 and 10–12. The results obtained are given in Table 2.

TABLE 2

| | Shape | Size | PV, cc/kg | R-MESO, Å | SCS, kp/mm |
|---|---|---|---|---|---|
| Example 6, reference | Cylinder | 1.01 | 1048 | 73.2 | 0.55 |
| Example 7 | Square | 1.01 | 1094 | 73.9 | 0.72 |
| Example 8 | Hexagon | 1.01 | 1055 | 75.6 | 0.96 |
| Example 10, reference | Cylinder | 1.01 | 1016 | 69.8 | 0.66 |
| Example 11 | Square | 1.01 | 1044 | 74.1 | 0.78 |
| Example 12 | Hexagon | 1.01 | 1000 | 73.2 | 0.98 |

It is noted that both the squared and the hexagonal particles have a mechanical strength that is higher than that of the cylindrical particles. It is also observed that the mechanical strength is decreasing with porosity according to the above relationship of Rytzkevitz. The higher mechanical strength that can be obtained on the non-cylindrical particles is thus beneficial as particles with a higher porosity can be made. For processes like ebullating bed (H-Oil or LC fining), it is beneficial to have catalysts available with a high porosity. The effective use of the catalysts for these processes depends on their ability to pick up and to store contaminants from the oil. The most common contaminants are often in the form of coke, Ni, V and other components often found in the oil.

What is claimed is:

1. A hydrotreating catalyst supported on a porous refractory carrier, wherein the catalyst comprises one or more metal oxides and/or sulfides selected from metals of Groups VI-B and VIII of the Periodic Table in the form of an angular extrudate having a hexagonal shape with rounded edges, said rounded edges having a radius of between 0.4 and 0.7 mm.

* * * * *